(12) United States Patent
Whipple

(10) Patent No.: US 7,349,945 B1
(45) Date of Patent: Mar. 25, 2008

(54) SYSTEM AND METHOD FOR MANAGING EVENT PUBLICATION AND SUBSCRIPTION

(75) Inventor: Mark B. Whipple, Dallas, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/534,915

(22) Filed: Mar. 23, 2000

(51) Int. Cl.
*G06F 15/16* (2006.01)

(52) U.S. Cl. .................. 709/206; 719/318; 709/207

(58) Field of Classification Search ............ 709/206, 709/300, 318, 319, 207; 719/318
See application file for complete search history.

(56) References Cited

U.S. PATENT DOCUMENTS

| | | | |
|---|---|---|---|
| 5,778,230 A * | 7/1998 | Wimble et al. ............ | 395/704 |
| 6,151,623 A * | 11/2000 | Harrison et al. ........... | 709/206 |
| 6,226,693 B1 * | 5/2001 | Chow et al. ............... | 709/318 |
| 6,393,458 B1 * | 5/2002 | Gigliotti et al. ........... | 709/203 |
| 6,438,585 B2 * | 8/2002 | Mousseau et al. ......... | 709/206 |
| 2002/0059380 A1 * | 5/2002 | Biliris et al. ............... | 709/206 |

* cited by examiner

*Primary Examiner*—Jason Cardone
*Assistant Examiner*—Adnan M Mirza
(74) *Attorney, Agent, or Firm*—Booth Udall, PLC

(57) ABSTRACT

A system for publishing and subscribing in event systems is disclosed. The system comprises a logical event manager. A physical event manager communicates with the logical event manager and a first and a second event producer-consumer. The physical event manager includes a first mapper that translates between the logical event manager and the first event producer-consumer and a second mapper that translates between the logical event manager and the second event producer-consumer. A method for publishing and subscribing in event systems is disclosed. A logical event manager receives a logical event from an event producer. The logical event is communicated from the logical event manager to a physical event manager. The physical event manager uses a first mapper to translate the logical event to a first signal, and a second mapper to translate the logical event to a second signal. The first and second signals are published to first and second event consumers.

56 Claims, 2 Drawing Sheets

SYSTEM AND METHOD FOR MANAGING EVENT PUBLICATION AND SUBSCRIPTION

TECHNICAL FIELD OF THE INVENTION

This invention relates generally to the field of computers and computer databases and more specifically to a system and method for managing event publication and subscription.

BACKGROUND OF THE INVENTION

The increasing complexity of the relationships among business entities has led to the rising demand for improved event publication and subscription systems. In many business situations, a business entity may want to be notified when a certain event occurs, for example, when a purchase order arrives. The entity may also want to be notified in a particular manner, for example, by receiving an e-mail message about the event. The entity may not need information regarding the other entity that produced the event, and may only need information that the event occurred and perhaps information about the event itself. Event subscription and publication may be used to request or to send notification of an event. To request notification, an event consumer may subscribe to an event manager for a particular event. The event manager monitors an event producer to see if the event occurs. When the event occurs, the event manager notifies the event consumer by publishing the event to the event consumer in the manner specified by the event consumer.

While known approaches have provided improvements over prior approaches, the challenges in the field of computers and computer databases have continued to increase with demands for more and better techniques having greater flexibility and effectiveness. Therefore, a need has arisen for a new method and system for managing event publication and subscription.

SUMMARY OF THE INVENTION

In accordance with the present invention, a method and system for publishing and subscribing in event systems are provided that substantially eliminate or reduce the disadvantages and problems associated with previously developed systems and methods.

According to one embodiment of the present invention, a system for publishing and subscribing in event systems is disclosed that comprises a logical event manager. A physical event manager communicates with the logical event manager and a first and a second event producer-consumer. The physical event manager includes a first mapper that translates between the logical event manager and the first event producer-consumer and a second mapper that translates between the logical event manager and the second event producer-consumer. More specifically, a listener-sender includes the first mapper and communicates with the logical event manager and the first and the second event producer-consumer.

According to one embodiment of the present invention, a method for publishing and subscribing in event systems is disclosed. A logical event manager receives a logical event from an event producer. The logical event is then communicated from the logical event manager to a physical event manager. The physical event manager uses a first mapper to translate the logical event to a first signal and a second mapper to translate the logical event to a second signal. The first signal is published to a first event consumer, and the second signal is published to a second event consumer.

According to another embodiment of the present invention, a method for publishing and subscribing in event systems is disclosed. A physical event manager receives a first signal from a first event producer and a second signal from a second event producer. A first mapper translates the first signal to a first logical event, and a second mapper translates the second signal to a second logical event. The first and second logical events are then communicated to a logical event manager.

According to another embodiment of the present invention, a method for publishing and subscribing in event systems is disclosed. A physical event manager receives a first signal from an event producer. A first mapper translates the first signal to a logical event. The logical event is communicated to a logical event manager. The logical event is then communicated to the physical event manager, where a second mapper translates the logical event to second signal. The second signal is communicated to an event consumer.

A technical advantage of the present invention is that the event manager has a physical event manager with mappers that translate events from multiple heterogeneous external entities to logical events, and vice-versa. By using the physical event manager, an event consumer may subscribe to an event without knowledge of the physical mechanisms of the event producer. Conversely, an event producer may publish an event without knowing the physical mechanisms of the event consumer, allowing for multiple heterogeneous event publication and subscription. Another technical advantage of the present invention is that the physical event manager may accommodate event types not possible in known approaches to event publication and subscription. For example, the physical event manager can search a directory for the appearance of a file, or can listen to a database for the occurrence of a trigger. Consequently, the present invention expands the variety of events and external entities, thus greatly increasing the flexibility and applicability of event publication and subscription systems.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
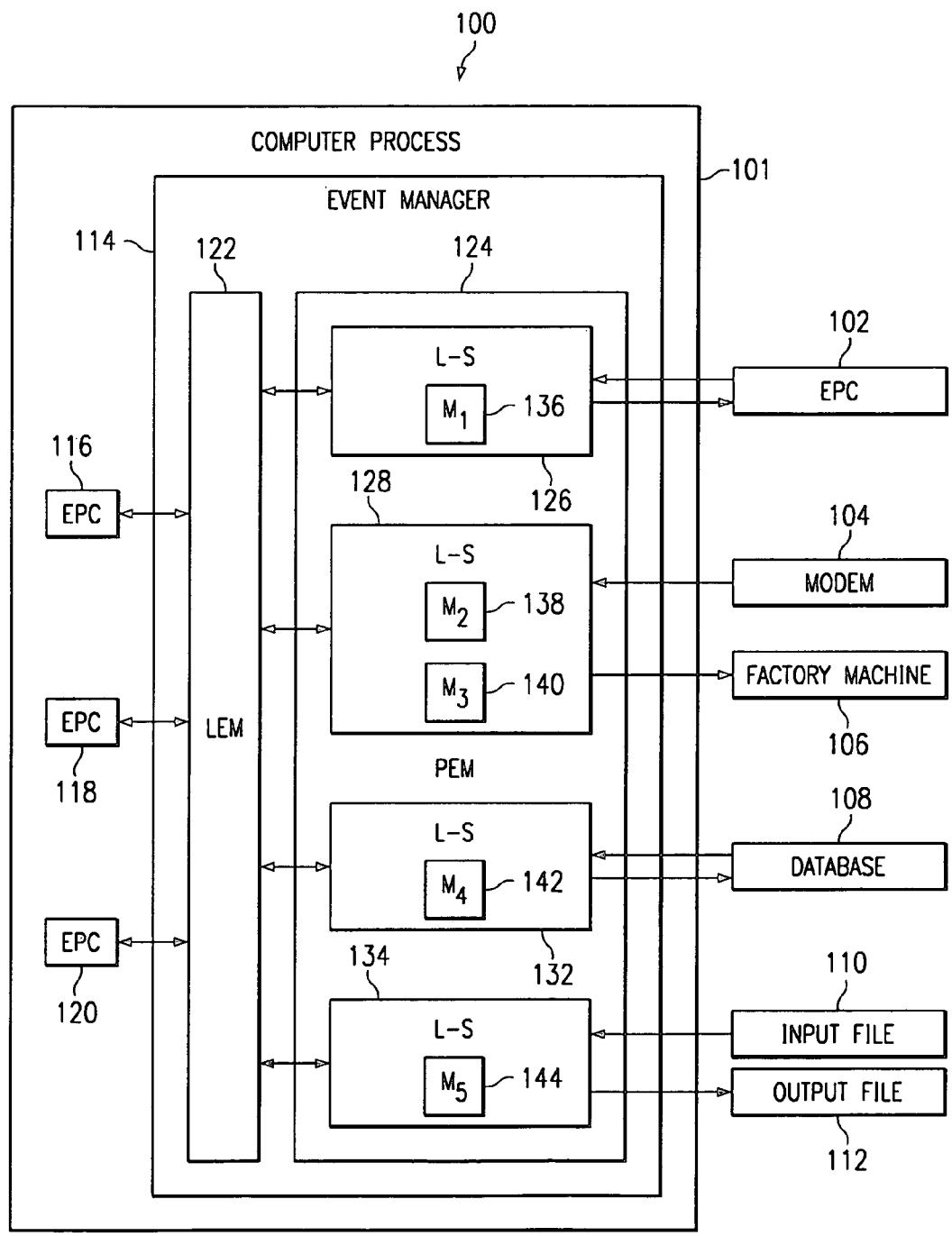
FIG. 1 is a block diagram of one embodiment of a system that may be used in accordance with the present invention.
Figure 2:
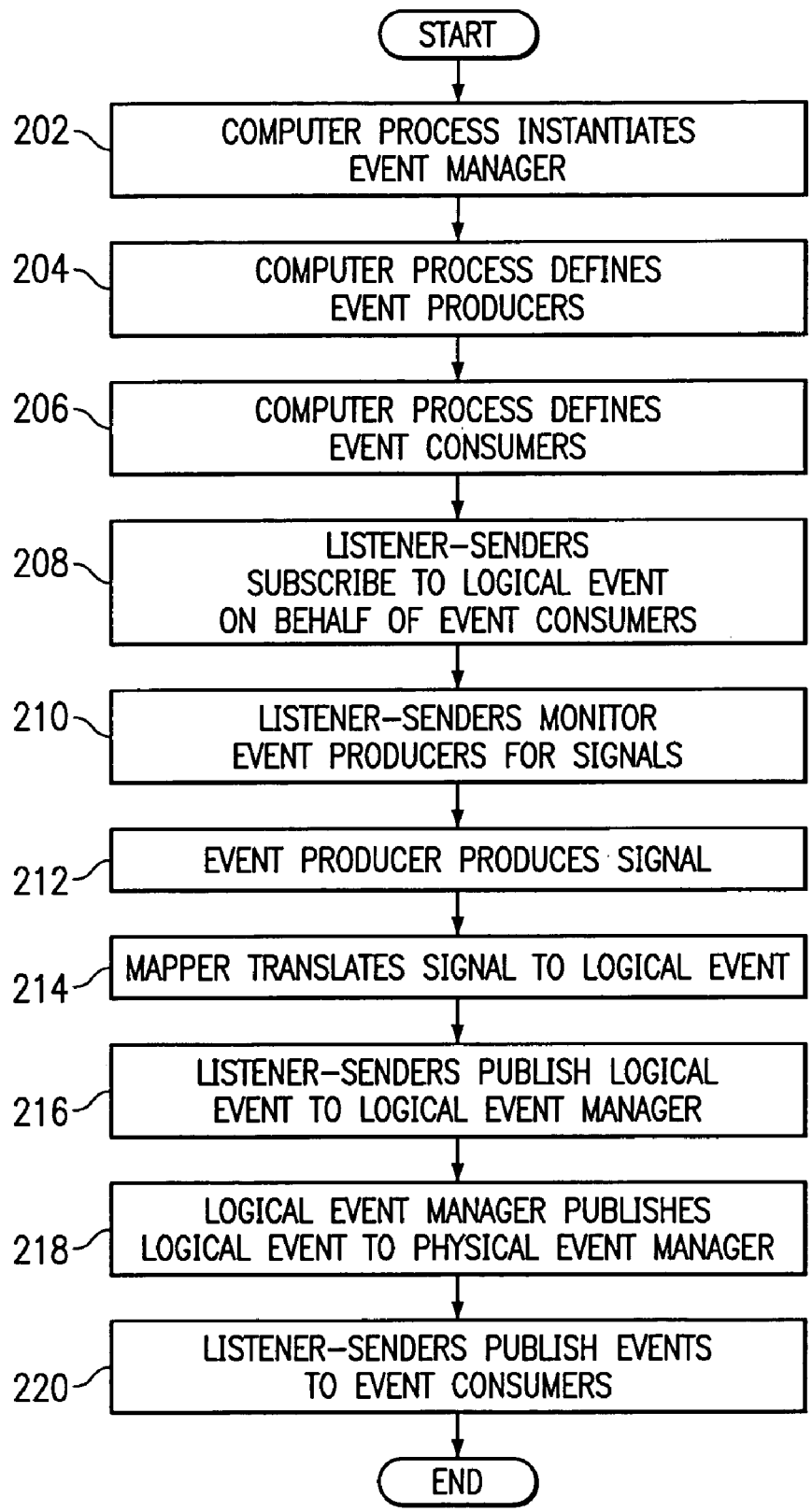
FIG. 2 is a flowchart demonstrating one embodiment of a method that may be used in accordance with the present invention.

An embodiment of the present invention and its advantages are best understood by referring to FIGS. 1 and 2 of the drawings, like numerals being used for like and corresponding parts of the various drawings.

In an event publication and subscription system, multiple entities may communicate with an event manager of a computer process. For example, a factory machine may subscribe to the event manager for notification of the occurrence of an event called "start machine." The event manager may monitor, or listen, to various event producers that trigger the start machine event. For example, the calling of a particular method in a CORBA server or the ringing of a modem may trigger the start machine event. When the start machine event occurs, the event manager publishes notification of the event to the factory machine, which is started as a result.

In order to communicate information between the event manager and the event producers and consumers external to the computer process, the events understandable by the external event producers and consumers must be translated to logical events understandable by the event manager. Known approaches to translating events place a translator between the event manager and the external entities. These approaches, however, increase the complexity and thus the cost of the system. Other known approaches attempt to change the event manager to accommodate different external entities. However, it may be too difficult to change the event manager to accommodate different external entities, and the event manager may not able to simultaneously handle different external entities. Other known approaches attempt to change the external entity. However, the external entity, for example, a modem, may simply be unable to be changed to communicate directly with the event manager. Furthermore, none of the above known approaches allow the event manager to accommodate certain types of events. For example, the event manager cannot detect the appearance of a file on an external entity using these approaches, precluding notification of this event.

FIG. 1 is a block diagram of one embodiment of a system 100 that may be used in accordance with the present invention. In general, system 100 may include external event publisher/consumers (EPCs) 102-112 in communication with an event manager 114 in a computer process 101. External EPCs 102-112 may subscribe to event manager 114 for notification of an event. When the event occurs, event manager 114 publishes the event to subscribing external EPCs 102-112. External EPCs 102-112 may also produce events that require notification. Event manager 114 monitors external EPCs 102-112 for the occurrence of the events. EPCs 116-120 internal to computer process 101 may also subscribe and publish to event manager 114.

Specifically, external EPCs 102-112 may include a variety of external entities. For example, external EPC 104 may be a modem, and external EPC 106 may be a factory machine. Factory machine 106 may subscribe to event manager 114 to be notified of the ringing of modem 104, for example. Event manager 114 then monitors, or listens, to modem 104 for the event. When modem 104 rings, event manager 114 notifies factory machine 106 of the event. As another example, external EPC 108 may be a database. External EPC 102 may subscribe to event manager 114 for a change in a database entry in database 108. As another example, external EPC 110 may be an input file and external EPC 112 may be an output file. Output file 112 may subscribe to the notification of the writing of a purchase order file to input file 110, which was not possible with known approaches to publication and subscription. Note that system 100 allows for simple effective multiple heterogeneous event exchange among a variety of external entities, which was unavailable with known approaches to publication and subscription.

In an embodiment of the present invention, event manager 114 includes a logical event manager (LEM) 122 in communication with a physical event manager 124, which is, in turn, in communication with external EPCs 102-112. Physical event manager 124 monitors external EPCs 102-112 for signals, translates the signals to logical events, and communicates the logical events to logical event manager 122 for further processing. Physical event manager 124 includes listener-senders (LSs) 126-134, which in turn include mappers 136-144. Listener-senders 126-134 monitor external EPCs 102-112 for signals and translate the signals to logical events using mappers 136-144. A listener-sender 132 may even search a directory of database 108 for a file, a process unavailable with known approaches to publication and subscription. Each listener-sender may monitor a specific type of device. For example, listener-sender 134 monitors files 110 and 112, while listener-sender 128 monitors serial devices modem 104 and factory machine 106. The mapper receives a specific type of signal from a specific type of external entity, extracts data from the event, and translates it into a logical event. The mapper may translate the signal to the logical event by, for example, performing a direct correlation or by using a lookup table that contains the correlation between the logical event and the signal. After the signals are translated into logical events, listener-senders 126-134 communicate the logical events to logical event manager 122. Logical event manager 122 receives the logical events and determines which internal and/or external EPCs are subscribing to the logical events.

Logical event manager 122 publishes the logical events to physical event manager 124, which translates them to signals using the appropriate mapper and sends them to the subscribing external EPCs 102-112 using the appropriate listener-sender. Alternatively, logical event manager 122 may receive logical events from and publish logical events to internal EPCs 116-120.

FIG. 2 is a flowchart demonstrating one embodiment of a method for managing event publication and subscription of the present invention. The flowchart is used to describe an exemplary embodiment where an event of interest, a "start machine" event can be produced by either of two mechanisms: a call to modem 104 connected to a telephone, or the insertion of a value into database 108. Two external entities act upon the occurrence of the start machine event: factory machine 106 starts operation, and input file 112 records the occurrence of the start machine event. All four external entities 104, 106, 108, and 112 converse using different protocols.

The method begins at step 202, where computer process 101 instantiates event manager 114. Computer process 101 defines a set of physical events, for example, listener-senders 126, 128, 132, and 134, where each physical event corresponds to an external entity and a set of mappers. At step 204, the event producers modem 104 and database 108 are defined. Either modem 104 or database 108 can produce a native signal for the start machine event. For example, modem 104 may produce a native signal. Physical event listener-sender 128, for example, a serial port accessor, may interpret the native signal. Mapper 138, for example, a modem string mapper, maps the signal to the equivalent start machine logical event. Alternatively, database 108 may produce a native signal, for example, a trigger. Physical event listener-sender 132 interprets the native signal. Mapper 142 maps the signal to the start machine logical event.

At step 206, event consumers factory machine 106 and output file 112 are defined. Factory machine 106 may receive a signal via its native mechanism, for example, a serial port. Listener-sender 128 and mapper 140, for example, machine serial codes, may interpret the start machine logical event and translate and transmit the event to factory machine 106. Output file 112 may receive a signal via its native mechanism, for example, a computer disk write. Listener-sender 134, for example, a file accessor, and mapper 144 may interpret the start machine logical event and translate and transmit the event to output file 112.

At step 208, listener-senders 128 and 134 subscribe to the start machine logical event on behalf of factory machine 106 and output file 112, respectively. At step 210, listener-senders monitor event producers modem 104 and database 108, respectively. Listener-senders 128 and 132 use native protocols to listen for signals from external entities modem 104 and database 108, respectively.

At step 212, an event producer produces a native signal. In one embodiment, event producer modem 104 receives a ring indication and signals listener-sender 128 via modem strings on the serial port. At step 214, mapper 138 translates the modem string to a start machine logical event. At step 216, the logical event is published to logical event manager 122. At step 218, logical event manager 122 publishes logical event to physical event manager 124. Logical event manager 122 recognizes that there are logical event subscriptions from listener-senders 128 and 134 and publishes the logical events to listener-senders 128 and 134. At step 220, listener-senders publish signals to event consumers. Mapper 140 translates the start machine logical event to protocol data understood by factory machine 106, and listener-sender 128 transmits the protocol data to factory machine 106. Similarly, mapper 144 translates the start machine logical event to a log file entry, and listener-sender 134 inserts data into output file 112, and the method terminates.

In another embodiment, at step 212, event producer database 108 produces a 'trigger' upon the insertion of data into a table. The trigger is understood by listener-sender 132. At step 214, mapper 142 translates the trigger notification to a start machine logical event. At step 216, the logical event is published to logical event manager 122. At step 218, logical event manager 122 publishes the logical event to physical event manager 124. Logical event manager 122 recognizes that there are logical event subscriptions from listener-senders 128 and 134 and publishes the logical events to listener-senders 128 and 134. At step 220, listener-senders publish signals to event consumers. Mapper 140 translates the start machine logical event to protocol data understood by factory machine 106, and listener-sender 128 transmits the protocol data to factory machine 106. Similarly, mapper 144 translates the start machine logical event to a log file entry. and listener-sender 134 inserts data into output file 112, and the method terminates.

A technical advantage of the present invention is that the event manager has a physical event manager with mappers that translate events from multiple heterogeneous external entities to logical events, and vice-versa. Using the physical event manager, an event consumer may subscribe to an event without knowing the physical mechanisms of the event producer, and conversely an event producer may publish an event without knowing the physical mechanisms of the event consumer, allowing for multiple heterogeneous event publication and subscription. Another technical advantage of the present invention is that the physical event manager may accommodate event types not possible in known approaches to event publication and subscription. For example, the physical event manager can search a directory for the appearance of a file on a database. Consequently, the present invention expands the variety of events and external entities, thus greatly increasing the flexibility and applicability of event publication and subscription systems.

Although an embodiment of the invention and its advantages are described in detail, a person skilled in the art could make various alternations, additions, and omissions without departing from the spirit and scope of the present invention as defined by the appended claims.

What is claimed is:

1. A system stored on a computer-readable media for managing event publication and subscription for event producer-consumers of heterogeneous types using a plurality of mappers each specific to a particular type of event producer-consumer, the system comprising: a logical event manager; and a physical event manager in communication with the logical event manager, a first event producer-consumer of a first type, and a second event producer-consumer of a second type, the first and second event producer-consumers being of heterogeneous types, wherein the physical event manager comprises: a first mapper specific to the first type of the first event producer-consumer and operable to translate between the logical event manager and the first event producer-consumer; and a second mapper specific to the second type of the second event producer-consumer and operable to translate between the logical event manager and the second event producer-consumer.

2. The system of claim 1, further comprising a listener-sender having the first mapper and in communication with the logical event manager and the first and second event producer-consumers.

3. The system of claim 1, wherein the first mapper is operable to translate a signal occurring at the first event producer-consumer to a logical event for the logical event manager.

4. The system of claim 1, wherein the first mapper is operable to translate a logical event occurring at the logical event manager to a signal for the first event producer-consumer.

5. The system of claim 1, wherein the first event producer-consumer is operable to subscribe to a logical event managed by the logical event manager.

6. The system of claim 1, wherein the logical event manager is operable to publish a signal to the first event producer-consumer.

7. The system of claim 1, wherein the first event producer-consumer is operable to communicate a signal to the logical event manager.

8. The system of claim 1, wherein the physical event manager is operable to monitor the first event producer-consumer for a signal.

9. A method for managing event publication and subscription for event consumers of heterogeneous types using a plurality of mappers each specific to a particular type of event consumer, the method comprising:
receiving a logical event from an event producer by a logical event manager;
communicating the logical event from the logical event manager to a physical event manager;
translating the logical event to a first signal by the physical event manager using a first mapper specific to a first type of event consumer;
translating the logical event to a second signal by the physical event manager using a second mapper specific to a second type of event consumer, the first and second event consumers being of heterogeneous types;
publishing the first signal to a first event consumer of the first type; and
publishing the second signal to a second event consumer of the second type, the first and second event consumers being of heterogeneous types.

10. The method of claim 9, further comprising communicating a subscription for a logical event from the first event consumer to the physical event manager.

11. The method of claim 9, further comprising:
communicating a first subscription for a logical event from the first event consumer to the physical event manager; and
translating the first subscription into a first logical subscription using the first mapper.

12. The method of claim 9, further comprising instantiating the physical event manager by establishing the first mapper and the second mapper, wherein the first mapper is associated with the logical event and the first event consumer and the second mapper is associated with the logical event and the second event consumer.

13. A method for managing event publication and subscription for event producers of heterogeneous types using a plurality of mappers each specific to a particular type of event producer, the method comprising:
receiving a first signal from a first event producer of a first type using a physical event manager;
receiving a second signal from a second event producer of a second type using the physical event manager, the first and second event producers being of heterogeneous types;
translating the first signal to a first logical event using a first mapper specific to the first type of the first event producer;
translating the second signal to a second logical event using a second mapper specific to the second type of the second event producer;
communicating the first logical event from the first mapper to a logical event manager; and
communicating the second logical event from the second mapper to the logical event manager.

14. The method of claim 13, further comprising communicating a subscription for the first logical event from a first event consumer to the physical event manager.

15. The method of claim 14, further comprising:
communicating a first subscription for a logical event from the first event consumer to the physical event manager; and
translating the first subscription into a first logical subscription using the first mapper.

16. The method of claim 13, further comprising communicating the first logical event from the logical event manager to a first event consumer.

17. The method of claim 13, further comprising monitoring the first event producer for the first signal.

18. The method of claim 13, further comprising instantiating the physical event manager by establishing the first mapper, wherein the first mapper is associated with the first logical event and the first event producer.

19. A method for managing event publication and subscription for event producer-consumers of heterogeneous types using a plurality of mappers each specific to a particular type of event producer-consumer, the method comprising:
receiving a first signal from an event producer of a first event producer-consumer type using a physical event manager;
translating the first signal to a logical event using a first mapper specific to the first event producer-consumer type;
communicating the logical event to a logical event manager;
communicating the logical event to the physical event manager;
translating the logical event to second signal using a second mapper specific to a second event producer-consumer type; and
communicating the second signal to an event consumer of the second event producer-consumer type, the event producer and the event consumer being of heterogeneous event producer-consumer types.

20. The method of claim 19, further comprising communicating a subscription for the logical event from the event consumer to the physical event manager.

21. The method of claim 19, further comprising monitoring the event producer for the first signal.

22. The method of claim 19, further comprising instantiating the physical event manager by establishing the first mapper, wherein the first mapper is associated with the logical event and the event producer.

23. A system stored on a computer-readable media for managing event publication and subscription for event producer-consumers of heterogeneous types using a plurality of mappers each specific to a particular type of event producer-consumer, comprising: a logical event manager; and a physical event manager in communication with the logical event manager and with a plurality of event producer-consumers, each event producer-consumer being of a particular type, the plurality of event producer-consumers being of heterogeneous types; the physical event manager comprising a plurality of mappers each corresponding to a particular type of event producer-consumer and operable to: for incoming physical events: receive a particular type of signal indicative of a physical event from the corresponding particular type of event producer-consumer; translate the particular type of signal received from the corresponding particular type of event producer-consumer into a logical event for communication to the logical event manager; for outgoing physical events: receive a logical event from the logical event manager; translate the logical event received from the logical event manager into a particular type of signal indicative of a physical event for communication to the corresponding particular type of event producer-consumer.

24. The system of claim 23, wherein the physical event manager is operable use the mappers to translate a single logical event into:
a first particular type of signal for communication to a corresponding first particular type of event producer-consumer; and
a second particular type of signal for communication to a corresponding second particular type of event producer-consumer.

25. The system of claim 24, further comprising one or more listener-senders each comprising one or more mappers, each listener-sender monitoring the one or more event producer-consumers corresponding to the one or more mappers of the listener-sender.

26. The system of claim 24, wherein the logical event manager is operable to allow each event producer-consumer to subscribe to one or more logical events managed by the logical event manager.

27. The system of claim 26, wherein the logical event manager is further operable to publish a logical event for communication to each event producer-consumer that has subscribed to the logical event, for each event producer-consumer that has subscribed to the logical event the logical event being translated using the corresponding mapper and communicated in the form of the corresponding particular type of signal.

28. The system of claim 24, wherein:
the system allows for heterogeneous event exchange among a plurality of event producer-consumers each supporting a different native protocol for communicating signals indicative of physical events;
no event producer-consumer needs to have knowledge of any other event producer-consumer for event exchange with the other event producer-consumer; and
no event producer-consumer needs to have knowledge of the native protocol for any other event producer-consumer for event exchange with the other event producer-consumer.

29. The system of claim 24, wherein:
the event producer-consumers are external event producer-consumers;
the logical event manager is in communication with a plurality of internal event-producer-consumers; and
the logical event manager is further operable to:
for incoming physical events, communicate the logical event to one or more internal event-producer-consumers;
for outgoing physical events, receive the logical event from an internal event-producer-consumer.

30. The system of claim 24, wherein:
a first event-producer-consumer comprises a first machine with a corresponding first mapper within the physical event manager and a corresponding first native protocol for communicating signals with the physical event manager;
a second event-producer-consumer comprises a second machine with a corresponding second mapper within the physical event manager and a corresponding second native protocol for communicating signals with the physical event manager; and
the physical event manager is operable to:
receive from the first machine a first signal in the first native protocol indicative of a physical event associated with the first machine;
use a first mapper corresponding to the first machine to translate the first signal received from the first machine in the first native protocol into a start machine logical event for communication to the logical event manager; and
use a second mapper corresponding to the second machine to translate the start machine logical event received from the logical event manager into a second signal in the second native protocol indicative of the start machine logical event for communication to the second machine, the second machine operable to start in response to receiving the second signal.

31. The system of claim 30, wherein the first and second native protocols are different protocols.

32. The system of claim 24, wherein:
a first event-producer-consumer comprises a first data store with a corresponding first mapper within the physical event manager and a corresponding first native protocol for communicating signals with the physical event manager;
a second event-producer-consumer comprises a second data store with a corresponding second mapper within the physical event manager and a corresponding second native protocol for communicating signals with the physical event manager; and
the physical event manager is operable to:
receive from the first data store a first signal in the first native protocol indicative of a physical event associated with the first data store;
use a first mapper corresponding to the first data store to translate the first signal received from the first data store in the first native protocol into a store data logical event for communication to the logical event manager; and
use a second mapper corresponding to the second data store to translate the store data logical event received from the logical event manager into a second signal in the second native protocol indicative of the store data logical event for communication to the second data store, the second machine operable to store data in response to receiving the second signal.

33. The system of claim 32, wherein the first and second native protocols are different protocols.

34. A method for managing event publication and subscription for event producer-consumers of heterogeneous types using a plurality of mappers each specific to a particular type of event producer-consumer, comprising:
establishing communication between a physical event manager and a logical event manager;
establishing communication between the physical event manager and a plurality of event producer-consumers, each event producer-consumer being of a particular type, the plurality of event producer-consumers being of heterogeneous types; and
using a plurality of mappers within the physical event manager, each corresponding to a particular type of event producer-consumer and operable to:
for incoming physical events:
receive a particular-type of signal indicative of a physical event from the corresponding particular type of event producer-consumer;
translate the particular type of signal received from the corresponding particular type of event producer-consumer into a logical event for communication to the logical event manager;
for outgoing physical events:
receive a logical event from the logical event manager;
translate the logical event received from the logical event manager into a particular type of signal indicative of a physical event for communication to the corresponding particular type of event producer-consumer.

35. The system of claim 34, further comprising using the mappers of the physical event manager to translate a single logical event into:
a first particular type of signal for communication to a corresponding first particular type of event producer-consumer; and
a second particular type of signal for communication to a corresponding second particular type of event producer-consumer.

36. The method of claim 34, further comprising using one or more listener-senders each comprising one or more mappers, each listener-sender monitoring the one or more event producer-consumers corresponding to the one or more mappers of the listener-sender.

37. The method of claim 34, further comprising using the logical event manager to allow each event producer-consumer to subscribe to one or more logical events managed by the logical event manager.

38. The method of claim 37, further comprising using the logical event manager to publish a logical event for communication to each event producer-consumer that has subscribed to the logical event, for each event producer-consumer that has subscribed to the logical event the logical event being translated using the corresponding mapper and communicated in the form of the corresponding particular type of signal.

39. The method of claim 34, wherein:
the method allows for heterogeneous event exchange among a plurality of event producer-consumers each supporting a different native protocol for communicating signals indicative of physical events;
no event producer-consumer needs to have knowledge of any other event producer-consumer for event exchange with the other event producer-consumer; and
no event producer-consumer needs to have knowledge of the native protocol for any other event producer-consumer for event exchange with the other event producer-consumer.

40. The method of claim 34, wherein:
the event producer-consumers are external event producer-consumers;
the logical event manager is in communication with a plurality of internal event-producer-consumers; and
the method further comprises using the logical event manager to:
for incoming physical events, communicate the logical event to one or more internal event-producer-consumers;
for outgoing physical events, receive the logical event from an internal event-producer-consumer.

41. The method of claim 34, wherein:
a first event-producer-consumer comprises a first machine with a corresponding first mapper within the physical event manager and a corresponding first native protocol for communicating signals with the physical event manager;
a second event-producer-consumer comprises a second machine with a corresponding second mapper within the physical event manager and a corresponding second native protocol for communicating signals with the physical event manager; and
the method further comprises using the physical event manager to:
receive from the first machine a first signal in the first native protocol indicative of a physical event associated with the first machine;
use a first mapper corresponding to the first machine to translate the first signal received from the first machine in the first native protocol into a start machine logical event for communication to the logical event manager; and
use a second mapper corresponding to the second machine to translate the start machine logical event received from the logical event manager into a second signal in the second native protocol indicative of the start machine logical event for communication to the second machine, the second machine operable to start in response to receiving the second signal.

42. The method of claim 41, wherein the first and second native protocols are different protocols.

43. The method of claim 34, wherein:
a first event-producer-consumer comprises a first data store with a corresponding first mapper within the physical event manager and a corresponding first native protocol for communicating signals with the physical event manager;
a second event-producer-consumer comprises a second data store with a corresponding second mapper within the physical event manager and a corresponding second native protocol for communicating signals with the physical event manager; and
the method further comprises using the physical event manager to:
receive from the first data store a first signal in the first native protocol indicative of a physical event associated with the first data store;
use a first mapper corresponding to the first data store to translate the first signal received from the first data store in the first native protocol into a store data logical event for communication to the logical event manager; and
use a second mapper corresponding to the second data store to translate the store data logical event received from the logical event manager into a second signal in the second native protocol indicative of the store data logical event for communication to the second data store, the second machine operable to store data in response to receiving the second signal.

44. The method of claim 43, wherein the first and second native protocols are different protocols.

45. Software for managing event publication and subscription for event producer-consumers of heterogeneous types using a plurality of mappers each specific to a particular type of event producer-consumer, the software embodied in computer-readable media and when executed operable to:
establish communication between a physical event manager and a logical event manager;
establish communication between the physical event manager and a plurality of event producer-consumers, each event producer-consumer being of a particular type, the plurality of event producer-consumers being of heterogeneous types; and
use a plurality of mappers within the physical event manager, each corresponding to a particular type of event producer-consumer and operable to:
for incoming physical events:
receive a particular type of signal indicative of a physical event from the corresponding particular type of event producer-consumer;
translate the particular type of signal received from the corresponding particular type of event producer-consumer into a logical event for communication to the logical event manager;
for outgoing physical events:
receive a logical event from the logical event manager;
translate the logical event received from the logical event manager into a particular type of signal indicative of a physical event for communication to the corresponding particular type of event producer-consumer.

46. The software of claim 45, further operable to use the mappers of the physical event manager to translate a single logical event into:
a first particular type of signal for communication to a corresponding first particular type of event producer-consumer; and a second particular type of signal for communication to a corresponding second particular type of event producer-consumer.

47. The software of claim 45, further operable to use one or more listener-senders each comprising one or more mappers, each listener-sender monitoring the one or more event producer-consumers corresponding to the one or more mappers of the listener-sender.

48. The software of claim 45, further operable to use the logical event manager to allow each event producer-consumer to subscribe to one or more logical events managed by the logical event manager.

49. The software of claim 48, further operable to use the logical event manager to publish a logical event for communication to each event producer-consumer that has subscribed to the logical event, for each event producer-consumer that has subscribed to the logical event the logical event being translated using the corresponding mapper and communicated in the form of the corresponding particular type of signal.

50. The software of claim 45, wherein:
the software allows for heterogeneous event exchange among a plurality of event producer-consumers each supporting a different native protocol for communicating signals indicative of physical events;
no event producer-consumer needs to have knowledge of any other event producer-consumer for event exchange with the other event producer-consumer; and
no event producer-consumer needs to have knowledge of the native protocol for any other event producer-consumer for event exchange with the other event producer-consumer.

51. The software of claim 45, wherein:
the event producer-consumers are external event producer-consumers;
the logical event manager is in communication with a plurality of internal event-producer-consumers; and
the software is further operable to use the logical event manager to:
for incoming physical events, communicate the logical event to one or more internal event-producer-consumers;
for outgoing physical events, receive the logical event from an internal event-producer-consumer.

52. The software of claim 45, wherein:
a first event-producer-consumer comprises a first machine with a corresponding first mapper within the physical event manager and a corresponding first native protocol for communicating signals with the physical event manager;
a second event-producer-consumer comprises a second machine with a corresponding second mapper within the physical event manager and a corresponding second native protocol for communicating signals with the physical event manager; and
the software is further operable to use the physical event manager to:
receive from the first machine a first signal in the first native protocol indicative of a physical event associated with the first machine;
use a first mapper corresponding to the first machine to translate the first signal received from the first machine in the first native protocol into a start machine logical event for communication to the logical event manager; and
use a second mapper corresponding to the second machine to translate the start machine logical event received from the logical event manager into a second signal in the second native protocol indicative of the start machine logical event for communication to the second machine, the second machine operable to start in response to receiving the second signal.

53. The software of claim 52, wherein the first and second native protocols are different protocols.

54. The software of claim 45, wherein:
a first event-producer-consumer comprises a first data store with a corresponding first mapper within the physical event manager and a corresponding first native protocol for communicating signals with the physical event manager;
a second event-producer-consumer comprises a second data store with a corresponding second mapper within the physical event manager and a corresponding second native protocol for communicating signals with the physical event manager; and
the software is further operable to use the physical event manager to:
receive from the first data store a first signal in the first native protocol indicative of a physical event associated with the first data store;
use a first mapper corresponding to the first data store to translate the first signal received from the first data store in the first native protocol into a store data logical event for communication to the logical event manager; and
use a second mapper corresponding to the second data store to translate the store data logical event received from the logical event manager into a second signal in the second native protocol indicative of the store data logical event for communication to the second data store, the second machine operable to store data in response to receiving the second signal.

55. The software of claim 54, wherein the first and second native protocols are different protocols.

56. A system stored on a computer-readable media for managing event publication and subscription for event producer-consumers of heterogeneous types using a plurality of mappers each specific to a particular type of event producer-consumer, comprising: first means for receiving and communicating logical events; and second means, in communication with the first means and with a plurality of event producer-consumers, each event producer-consumer being of a particular type, the plurality of event producer-consumers being of heterogeneous types, for translating signals received from event producer-consumers into logical events for communication to the first means and for translating logical events received from the first means into signals for communication event producer-consumers; the second means comprising a plurality of mapping means each corresponding to a particular type of event producer-consumer and each for incoming physical events: receiving a particular type of signal indicative of a physical event from the corresponding particular type of event producer-consumer; translating the particular type of signal received from the corresponding particular type of event producer-consumer into a logical event for communication to the first means; for outgoing physical events: receiving a logical event from the first means; translating the logical event received from the first means into a particular type of signal indicative of a physical event for communication to the corresponding particular type of event producer-consumer.

* * * * *